US010555330B2

(12) United States Patent
Ou et al.

(10) Patent No.: US 10,555,330 B2
(45) Date of Patent: Feb. 4, 2020

(54) TERMINAL STATION APPARATUS AND BAND ALLOCATION METHOD (71) Applicant: NIPPON TELEGRAPH AND TELEPHONE CORPORATION, Tokyo (JP)

(72) Inventors: Hiroshi Ou, Yokosuka (JP); Takayuki Kobayashi, Yokosuka (JP); Daisuke Hisano, Yokosuka (JP); Tatsuya Shimada, Yokosuka (JP)

(73) Assignee: NIPPON TELEGRAPH AND TELEPHONE CORPORATION, Tokyo (JP)

( * ) Notice: Subject to any disclaimer, the term of this patent is extended or adjusted under 35 U.S.C. 154(b) by 0 days.

(21) Appl. No.: 16/075,205

(22) PCT Filed: Jan. 23, 2017

(86) PCT No.: PCT/JP2017/002136
§ 371 (c)(1),
(2) Date: Aug. 3, 2018

(87) PCT Pub. No.: WO2017/149996
PCT Pub. Date: Sep. 8, 2017

(65) Prior Publication Data
US 2019/0007955 A1 Jan. 3, 2019

(30) Foreign Application Priority Data

Feb. 29, 2016 (JP) .................................. 2016-038416

(51) Int. Cl.
H04W 72/12 (2009.01)
H04L 12/44 (2006.01)
(Continued)

(52) U.S. Cl.
CPC .......... *H04W 72/1221* (2013.01); *H04J 3/16* (2013.01); *H04L 12/44* (2013.01); *H04W 56/001* (2013.01);
(Continued)

(58) Field of Classification Search
CPC .......... H04W 72/1221; H04W 56/001; H04W 56/003; H04W 72/0453; H04J 3/16; H04L 12/44
See application file for complete search history.

(56) References Cited

U.S. PATENT DOCUMENTS

2007/0041384 A1 2/2007 Das et al.
2009/0162065 A1 6/2009 Mizutani et al.
(Continued)

FOREIGN PATENT DOCUMENTS

JP 3768421 B2 4/2006
JP 2009-152916 A 7/2009
(Continued)

OTHER PUBLICATIONS

IEEE Std. 802.3-2012, IEEE, 2012, Section Five.
(Continued)

*Primary Examiner* — Mounir Moutaouakil
(74) *Attorney, Agent, or Firm* — Harness, Dickey & Pierce, P.L.C.

(57) ABSTRACT

A terminal station device is a terminal station device of a communication system in which a high-order device, the terminal station device, an end-terminal device, and a low-order device are communicably connected in this order, the high-order device notifies the low-order device of resource information indicating a resource that is usable in communication, and thereby the resource is allocated to the low-order device. The terminal station device includes: a band allocation unit that allocates a band that is permitted to be
(Continued)

used by the end-terminal device for transmission processing to the terminal station device, based on an interval at which the terminal station device has received the resource information.

15 Claims, 5 Drawing Sheets (51) Int. Cl.
  *H04J 3/16* (2006.01)
  *H04W 56/00* (2009.01)
  *H04W 72/04* (2009.01)
(52) U.S. Cl.
  CPC ..... *H04W 56/003* (2013.01); *H04W 72/0453* (2013.01)

(56) References Cited

U.S. PATENT DOCUMENTS

| | | | |
|---|---|---|---|
| 2011/0053495 A1* | 3/2011 | Hara | H04B 7/15542 455/7 |
| 2012/0236809 A1* | 9/2012 | Senoo | H04L 5/00 370/329 |
| 2015/0229397 A1 | 8/2015 | Shibata et al. | |
| 2015/0311980 A1 | 10/2015 | Kuwano et al. | |
| 2017/0041750 A1* | 2/2017 | Jose | G01S 5/0205 |
| 2017/0215083 A1* | 7/2017 | Kudo | H04W 16/14 |
| 2017/0223744 A1* | 8/2017 | Qian | H04W 74/0833 |
| 2019/0037546 A1* | 1/2019 | You | H04W 72/1289 |
| 2019/0281636 A1* | 9/2019 | Liu | H04W 72/0446 |

FOREIGN PATENT DOCUMENTS

| | | |
|---|---|---|
| WO | WO-2014/061552 A1 | 4/2014 |
| WO | WO-2014/077168 A1 | 5/2014 |

OTHER PUBLICATIONS

Tashiro, T et al., A novel DBA scheme for TDM-PON based mobile fronthaul, Optical Fiber Communication Conference, 2014, pp. Tu3F-3.

International Search Report for PCT/JP2017/002136, ISA/JP, dated Apr. 18, 2017, with English translation attached.

* cited by examiner

TERMINAL STATION APPARATUS AND BAND ALLOCATION METHOD

CROSS REFERENCE TO RELATED APPLICATIONS

This application is a 371 U.S. National Stage of International Application No. PCT/JP2017/002136, filed on Jan. 23, 2017. Priority is claimed on Japanese Patent Application No. 2016-038416, filed Feb. 29, 2016. The entire contents of both applications are incorporated herein by reference.

TECHNICAL FIELD

The present invention relates to a communication technique in a passive optical communication network system.

BACKGROUND ART

FTTH (Fiber to The Home) is a representative example of optical access. In optical access, in general a passive optical communication network in which a terminal station device and a plurality of end-terminal devices are connected is used.

With such a configuration, optical access realizes economical service provision. In the passive optical communication network, communication between the terminal station device and the end-terminal device is multiplexed by means of time-division multiplexing. Communication from the terminal station device to the end-terminal device (hereinafter referred to as "uplink communication") is realized by using a control protocol called MPCP (Multi-Point Control Protocol) (refer to Non-Patent Document 1). The transmission amount and the transmission start time in the uplink communication of each end-terminal device are centrally controlled in the terminal station device. There has also been proposed a technique for achieving a high band utilization efficiency by determining a transmission amount by using a requested amount from each end-terminal device (refer to Patent Document 1).

In recent years, there has also been proposed a communication system in which another communication network is accommodated via a passive optical communication network.

In this type of communication system, the terminal station device of a passive optical communication network, and a high-order device connected to the high-order of the terminal station device are controlled in cooperation with each other. By performing the control in cooperation with each other, it is possible to reduce delay in uplink communication from the end-terminal device to the terminal station device. There has been proposed a technique for realizing an economical network installation by applying a passive optical communication network to a mobile wireless communication service network (hereinafter referred to as "mobile network") which has a very strict requirement for a delay (refer to Patent Document 2). Specific examples of mobile networks include LTE (Long Term Evolution) and LTE-advanced. In these types of techniques, the terminal station device performs band allocation to each end-terminal device using wireless resource information notified from the high-order device. At this time, it is necessary to establish clock synchronization between the terminal station device and the high-order device.

PRIOR ART DOCUMENTS

Patent Documents

[Patent Document 1] Japanese Patent No. 3768421
[Patent Document 2] PCT International Publication No. WO 2014/077168

Non-Patent Documents

[Non-Patent Document 1] "IEEE Std. 802.3-2012", IEEE, 2012

SUMMARY OF INVENTION

Problem to be Solved by the Invention

In some cases, clock synchronization may be lost between the terminal station device and the high-order device due to abnormality of the devices. Even in such a case, since the terminal station device and the high-order device each have a clock source, the operation can be continued independently based on the clocks output from the respective clock sources. However, since there is a precision error between the clock source of the terminal station device and the clock source of the high-order device, the time between the terminal station device and the high-order device greatly deviates as time elapses. That is to say, as the time elapses, the timing at which the terminal station device executes band allocation deviates from the timing at which the execution intrinsically needs to be carried out. Therefore, there is a possibility that ideal band allocation cannot be performed and the delay may increase in some cases.

In view of the above circumstances, it is an object of the present invention to provide a technique that enables a reduction in deviation in timing at which a terminal station device executes band allocation.

Means for Solving the Problem

A terminal station device according to one aspect of the present invention is a terminal station device of a communication system in which a high-order device, the terminal station device, an end-terminal device, and a low-order device are communicably connected in this order, the high-order device notifies the low-order device of resource information indicating a resource that is usable in communication, and thereby the resource is allocated to the low-order device. The terminal station device includes: a band allocation unit that allocates a band that is permitted to be used by the end-terminal device for transmission processing to the terminal station device, based on an interval at which the terminal station device has received the resource information.

A band allocation method according to one aspect of the present invention is a band allocation method performed by a terminal station device of a communication system in which a high-order device, the terminal station device, an end-terminal device, and a low-order device are communicably connected in this order, the high-order device notifies the low-order device of resource information indicating a resource that is usable in communication, and thereby the source is allocated to the low-order device. The band allocation method includes: allocating a band that is permitted to be used by the end-terminal device for transmission processing to the terminal station device, based on an interval at which the terminal station device has received the resource information.

Effect of the Invention

The present invention enables reduction in deviation in timing at which a terminal station device executes band allocation.

EMBODIMENTS FOR CARRYING OUT THE INVENTION

First Embodiment

Figure 1:
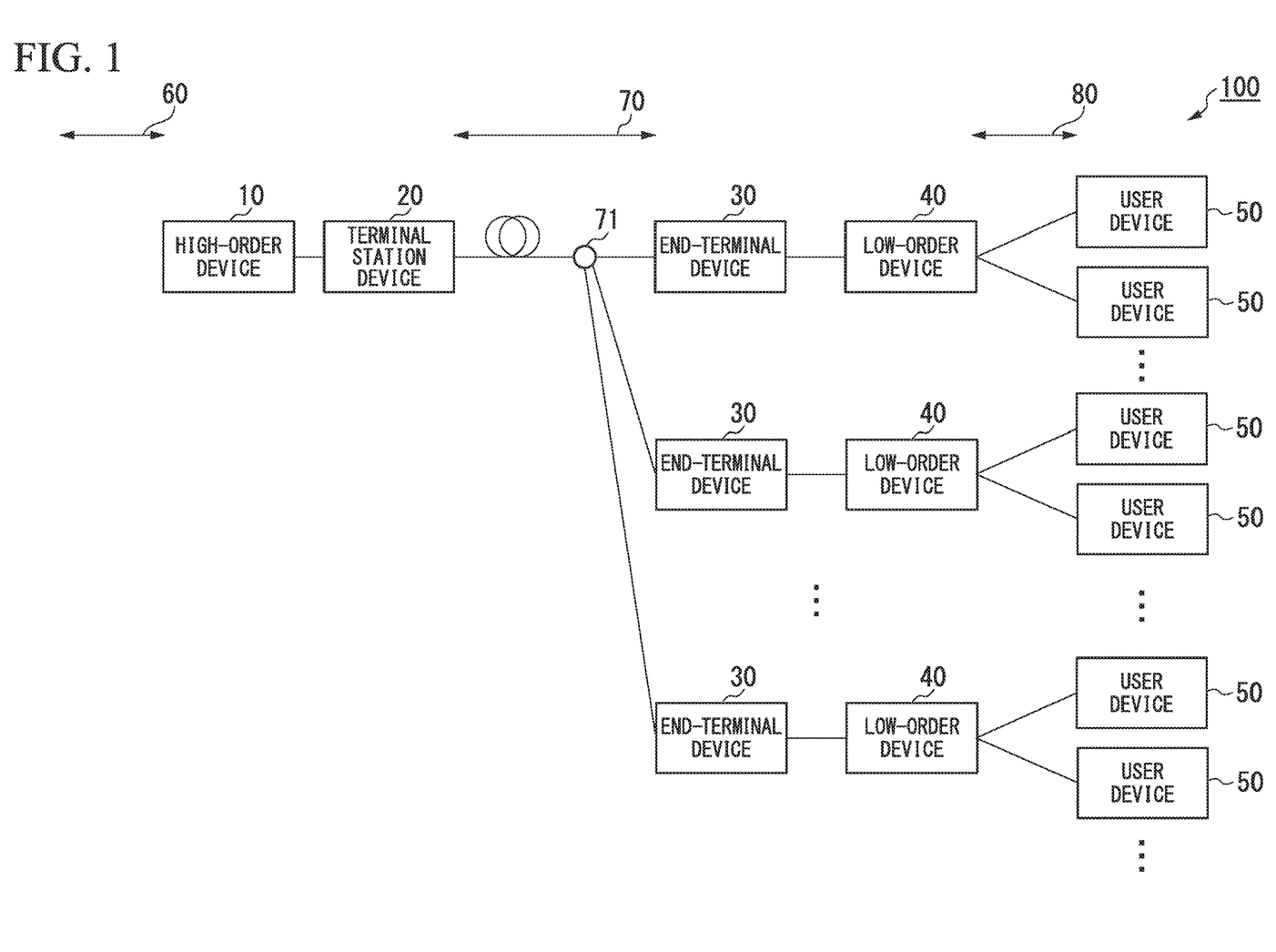
FIG. 1 is a diagram showing a system configuration example of a communication system (communication system 100) of a first embodiment.

FIG. 1 is a diagram showing a system configuration example of a communication system (communication system 100) according to a first embodiment. The communication system 100 includes a high-order device 10, a terminal station device 20, a plurality of end-terminal devices 30, and a plurality of low-order devices 40. The high-order device 10 is connected to a high-order network 60 corresponding to a high-order network of the communication system 100. The high-order device 10 and the terminal station device 20 are connected in a one-to-one manner. The terminal station device 20 and the plurality of end-terminal devices 30 are communicably connected via a relay network 70. Each of the low-order devices 40 may be communicably connected to a plurality of user devices 50 via a low-order network 80. The high-order device 10 is communicably connected to the plurality of low-order devices 40 via the terminal station device 20, the relay network 70, and the plurality of end-terminal devices 30. The relay network 70 includes a relay unit 71. The relay unit 71 is a device that branches light. The relay unit 71 is, for example, an optical splitter.

The relay unit 71 may be a multiplexing device that multiplexes or demultiplexes optical signals.

The high-order device 10 is a device that realizes a predetermined function by performing communication with the plurality of low-order devices 40. The high-order device 10 is, for example, a base station device (BBU: Base Band Unit) in a mobile network.

The terminal station device 20 is a device that terminates the relay network 70 on the high-order side. The terminal station device 20 is, for example, an optical subscriber line terminal station device (OLT: Optical Line Terminal). The terminal station device 20 executes band allocation processing based on wireless resource information notified from the high-order device 10. By executing the band allocation processing, the terminal station device 20 determines a transmission amount and a transmission start time in the uplink communication for the plurality of end-terminal devices 30.

The end-terminal device 30 is a device that terminates the relay network 70 on the low-order side. The end-terminal device 30 is, for example, an optical line end-terminal device (ONU: Optical Network Unit). The end-terminal device 30 is connected to the low-order device 40 in a one-to-one manner.

The low-order device 40 is a device that realizes a predetermined function by performing communication with the high-order device 10. The low-order device 40 is a device that is installed closer to the user side than to the high-order device 10. For example, in the case where the high-order device 10 is a BBU, the low-order device 40 is a radio device (RRH: Remote Radio Head) in a mobile network. The low-order device 40 accommodates, for example, a plurality of user devices 50. The low-order device 40 starts transmission of uplink data based on scheduling information notified from the high-order device 10. This type of processing may be performed by the user device 50.

The user device 50 is a device that is connected to the low-order device 40 via the low-order network 80 so as to thereby be connected communicably to other devices via the relay network 70 and the high-order network 60. The user device 50 is an information processing device such as a smartphone, a tablet, a computer, and the like. The user device 50 may be a sensor in IoT (Internet of Things), for example. The user device 50 may be a device for business use, such as an ATM (Automatic Teller Machine), an automatic vending machine, a POS (Point of Sale) terminal, and the like.

Figure 2:
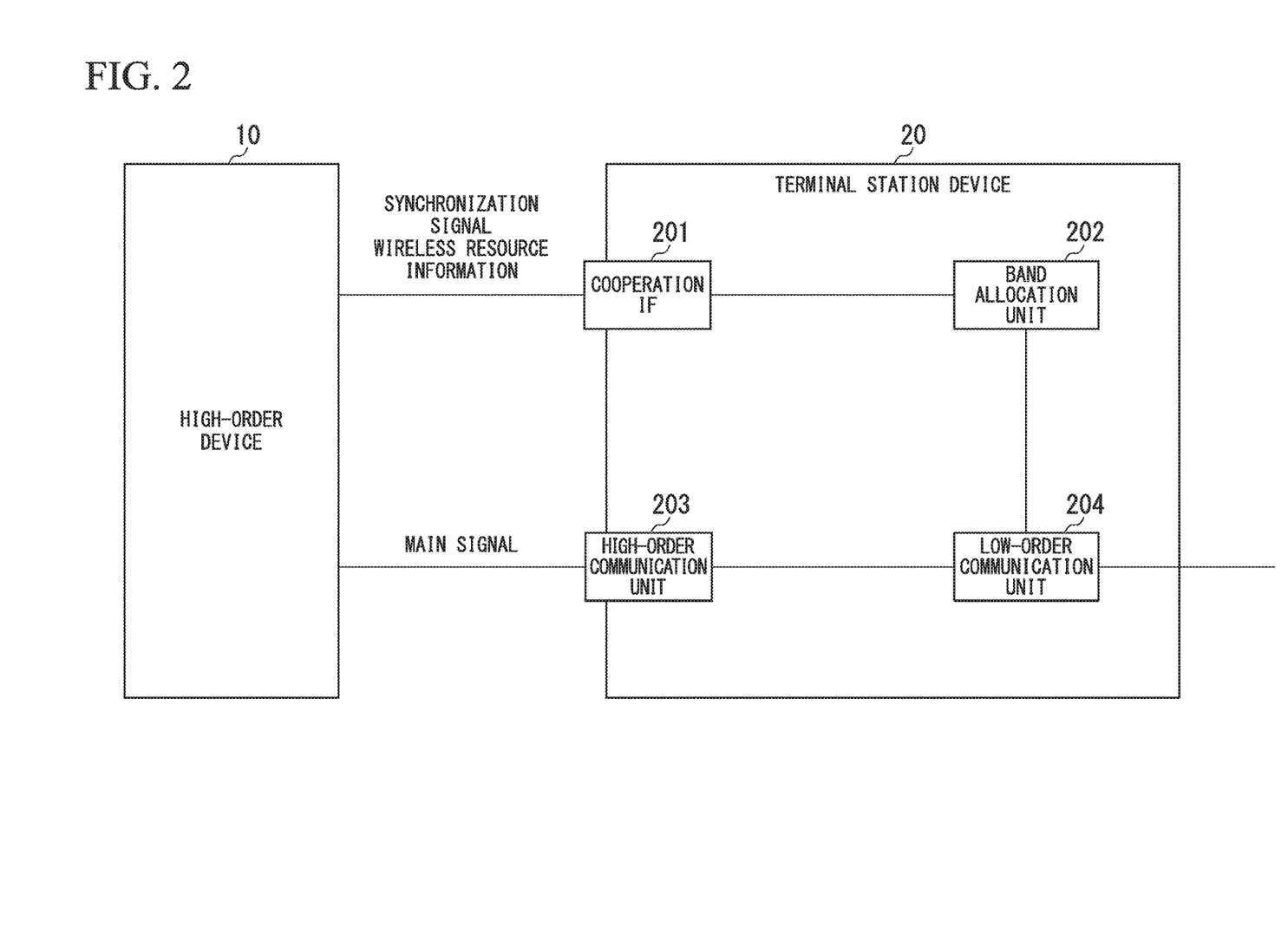
FIG. 2 is a schematic block diagram showing a functional configuration of a terminal station device 20 in the first embodiment.

FIG. 2 is a schematic block diagram showing a functional configuration of the terminal station device 20 in the first embodiment.

The terminal station device 20 includes a cooperation IF (interface) 201, a band allocation unit 202, a high-order communication unit 203, and a low-order communication unit 204. The cooperation IF 201 may be an example of an interface. The high-order communication unit 203 may be an example of an interface. The functions of the cooperation IF 201, the band allocation unit 202, the high-order communication unit 203, and the low-order communication unit 204 may be realized, for example, by executing a program by means of a CPU (Central Processing Unit) and a memory provided in the terminal station device 20. Moreover, all or some of the functions mentioned above may be realized by using hardware such as ASIC (Application Specific Integrated Circuit), PLD (Programmable Logic Device), and FPGA (Field Programmable Gate Array). The program to be executed may be recorded on a computer-readable recording medium. The computer-readable recording medium is, for example, a portable medium such as a flexible disk, a magnetic optical disk, a ROM, a CD-ROM, and the like, or a storage device such as a hard disk built into a computer system. The program may be transmitted via an electrical communication line.

The cooperation IF 201 includes a communication interface for communicating with the high-order device 10. The cooperation IF 201 receives synchronization signals and wireless resource information from the high-order device 10. The synchronization signal is a signal used by the terminal station device 20 to synchronize a frequency according to the clock source of the high-order device 10.

The synchronization signal is, for example, a signal of SyncE (Synchronous Ethernet (registered trademark)), PTP (Precision Time Protocol), 1 PPS (Pulse Per Second), and 10 MHz. The terminal station device 20 synchronizes its own the clock with the clock of the high-order device 10, based on the synchronization signal. The wireless resource information is information on wireless line allocation between the low-order device 40 and the user device 50. The wireless resource information includes for example allocation destination information, resource information, and communication destination information. The allocation destination information is information that indicates the user device 50 to which a wireless resource is allocated. The resource information is information that indicates the allocated wireless resource. The communication destination information is information that indicates the low-order device 40 as a communication partner of the user device 50. For example, the wireless resource information is notified to the terminal station device 20 at a cycle at which the high-order device 10 generates scheduling information.

The band allocation unit 202 executes the band allocation processing based on the wireless resource information received by the cooperation IF 201. Specifically, the processing is carried out as follows. Based on the wireless resource information, the band allocation unit 202 preliminarily acquires information that indicates the amount and arrival time of uplink data arriving at each end-terminal device 30. The band allocation unit 202 creates a transmission permission and notifies it to each end-terminal device 30 in accordance with the arrival time of the uplink data. The notification of the transmission permission is performed via the low-order communication unit 204. The transmission permission is information related to transmission that each end-terminal device 30 is permitted to perform with respect to the terminal station device 20. The transmission permission includes, for example, the transmission start time and the permitted transmission amount in each end-terminal device 30. The transmission start time indicates a time at which the end-terminal device 30 is permitted to start the processing of transmission to the terminal station device 20. The permitted transmission amount indicates an amount of data for which the end-terminal device 30 is permitted to perform transmission processing with respect to the terminal station device 20.

The high-order communication unit 203 includes a communication interface for communicating with the high-order device 10. The high-order communication unit 203 is, for example, an SNI (Service Node Interface). The high-order communication unit 203 transmits and receives main signals to and from the high-order device 10. The high-order communication unit 203 receives a main signal transmitted from the high-order device 10, and relays the received main signal to the low-order communication unit 204. The high-order communication unit 203 relays the main signal received by the low-order communication unit 204 to the high-order device 10. In the case where wireless resource information is included in the main signal, the high-order communication unit 203 may extract the wireless resource information from the main signal. In this case, the high-order communication unit 203 may output the extracted wireless resource information to the cooperation IF 201 or the band allocation unit 202.

The low-order communication unit 204 includes a communication interface for communicating with the end-terminal device 30 via the relay network 70. The low-order communication unit 204 is, for example, a PON (passive optical network)—IF. The low-order communication unit 204 transmits and receives main signals to and from the end-terminal device 30. The low-order communication unit 204 receives a main signal transmitted from the end-terminal device 30 and relays the received main signal to the high-order communication unit 203. The low-order communication unit 204 relays the main signal received by the high-order communication unit 203 to the end-terminal device 30.

Figure 3:
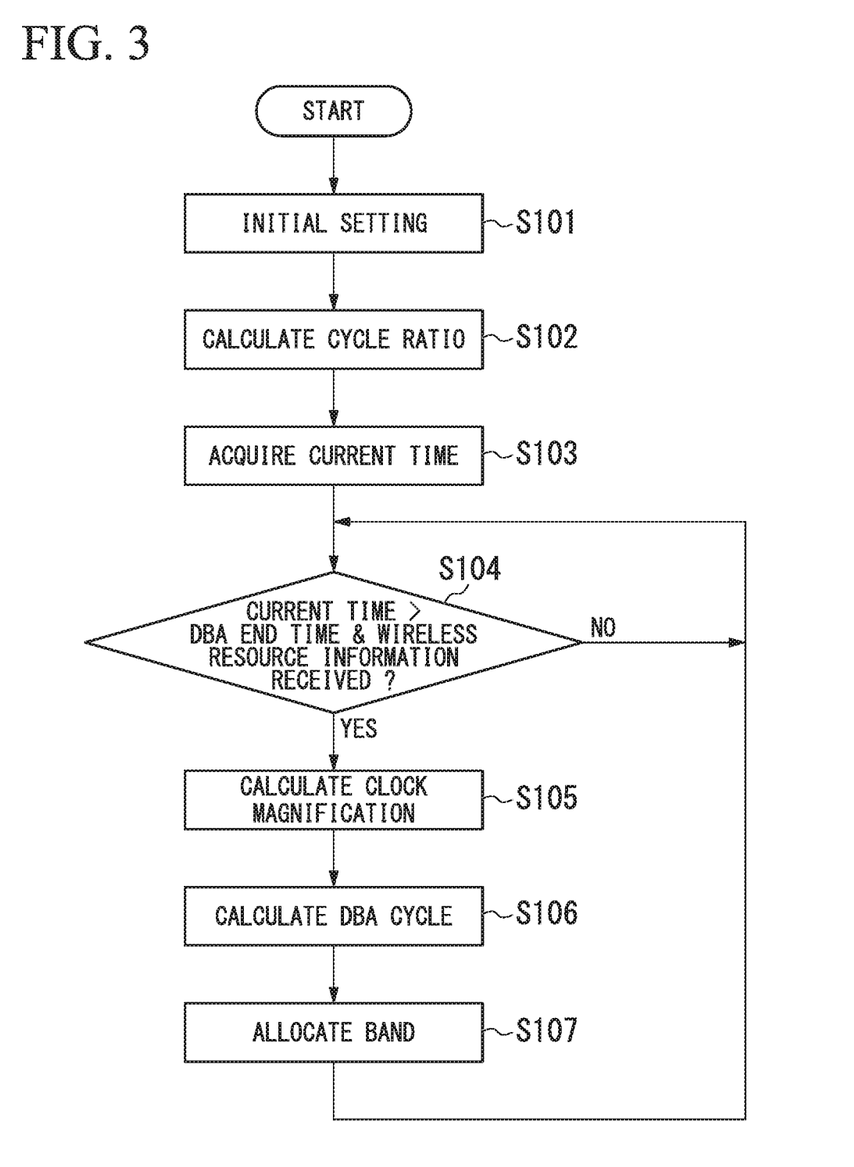
FIG. 3 is a flowchart showing a specific example of a processing flow of the terminal station device 20 in the first embodiment.

FIG. 3 is a flowchart showing a specific example of a processing flow of the terminal station device 20 in the first embodiment. First, the band allocation unit 202 executes an initial setting process (Step S101).

In the initial setting process, the band allocation unit 202 sets respective values, namely: a wireless resource information notification interval, a DBA (dynamic bandwidth allocation) cycle, a DBA end time, and a clock magnification. The wireless resource information notification interval is a temporal interval at which the high-order device 10 notifies the wireless resource information to the terminal station device 20. The DBA cycle is an allocation target time for when the band allocation unit 202 executes the band allocation process. The DBA end time is an ending time of the allocation target time for when the band allocation unit 202 last executed the band allocation process. The initial value of the DBA end time is "0". The clock magnification is a coefficient that indicates a deviation in clock synchronization between the high-order device 10 and the terminal station device 20. The initial value of the clock magnification is "1".

The band allocation unit 202 calculates a cycle ratio based on Formula 1. That is to say, the band allocation unit 202 calculates the ratio between the DBA cycle and the wireless resource information notification interval as a cycle ratio (Step S102).

[Formula 1]

$$\text{CYCLE RATIO} = \frac{\text{DBA CYCLE}}{\text{WIRELESS RESOURCE INFORMATION NOTIFICATION INTERVAL}} \quad \text{(FORMULA 1)}$$

Next, the band allocation unit 202 waits until both of the following two conditions are satisfied (NO in Steps S103 and S104).

Condition 1: The previous band allocation target time has ended. That is to say, the current time has exceeded the DBA end time.

Condition 2: New wireless resource information has been received.

If the conditions are satisfied (YES in Step S104), the band allocation unit 202 calculates a new clock magnification (Step S105). The new clock magnification is calculated based on the following Formula 2.

[Formula 2]

$$\text{NEW CLOCK MAGNIFICATION} = \text{PREVIOUS CLOCK MAGNIFICATION} \times \frac{\text{WIRELESS RESOURCE INFORMATION RECEPTION INTERVAL}}{\text{WIRELESS RESOURCE INFORMATION NOTIFICATION INTERVAL}} \quad \text{(FORMULA 2)}$$

A previous clock magnification indicates the clock magnification calculated in the previous cycle. A wireless resource information reception interval indicates a length of time from when the previous wireless resource information was received to when the current wireless resource information is received. The value of the DBA cycle used in Formula 2 is the value of the DBA cycle calculated in the previous cycle.

Next, the band allocation unit 202 sets a new DBA cycle (Step S306). The band allocation unit 202 calculates a new DBA cycle based on the following Formula 3.

[Formula 3]

$$\text{NEW DBA CYCLE} = \text{WIRELESS RESOURCE INFORMATION RECEPTION INTERVAL} \times \text{CYCLE RATIO} \quad \text{(FORMULA 3)}$$

Then, the band allocation unit 202 executes the band allocation process for each end-terminal device 30 (Step S107). In the band allocation process, the band allocation unit 202 acquires a requested amount based on the wireless resource information. Then, the band allocation unit 202 determines the band to be allocated to each of the end-terminal devices 30, with the newly set DBA cycle as the allocation target time. More specifically, the band allocation unit 202 allocates a value obtained by multiplying the acquired requested amount by the clock magnification, as a band to the end-terminal device 30. As a result, the band allocation unit 202 can allocate a band to the end-terminal device 30 so as not to exceed the allocable band in one DBA cycle. Then, the band allocation unit 202 updates the DBA end time to the sum (time) that is obtained by adding the DBA cycle to the current time. The band allocation unit 202 repeatedly executes the processing of the flowchart shown in FIG. 3.

In the communication system 100 configured in this manner, the band allocation unit 202 of the terminal station device 20 calculates the DBA cycle based on the wireless resource information reception interval. Then, the DBA cycle is determined so that the band allocation start time coincides with the reception time of the wireless resource information. For example, in the case where the clock in the terminal station device 20 is slow, the start time of band allocation is delayed. To address this problem, the band allocation unit 202 shortens the DBA cycle. Therefore expansion of the influence of clock deviation can be prevented. On the other hand, in the case where the clock in the terminal station device 20 is fast, the start time of band allocation becomes early, and the wireless resource information is not delivered before starting band allocation. To address this problem, the band allocation unit 202 prolongs the DBA cycle. Therefore expansion of the influence of clock deviation can be prevented. As described above, even if the clock synchronization deviates between the high-order device 10 and the terminal station device 20, it is possible to prevent an increase in deviation in the timing at which the terminal station device 20 executes the band allocation process. As a result, uplink communication (communication in the direction from the low-order device 40 to the high-order device 10) can be maintained.

Modified Example

In FIG. 2, the transmission of the synchronization signal and the wireless resource information from the high-order device 10 to the terminal station device 20 is performed in a communication path different to that for the transmission of the main signal. However, the transmission of either one or both of the transmission of the synchronization signal and the wireless resource information may be performed in the same communication path as that for the transmission of the main signal.

Second Embodiment

Figure 4:
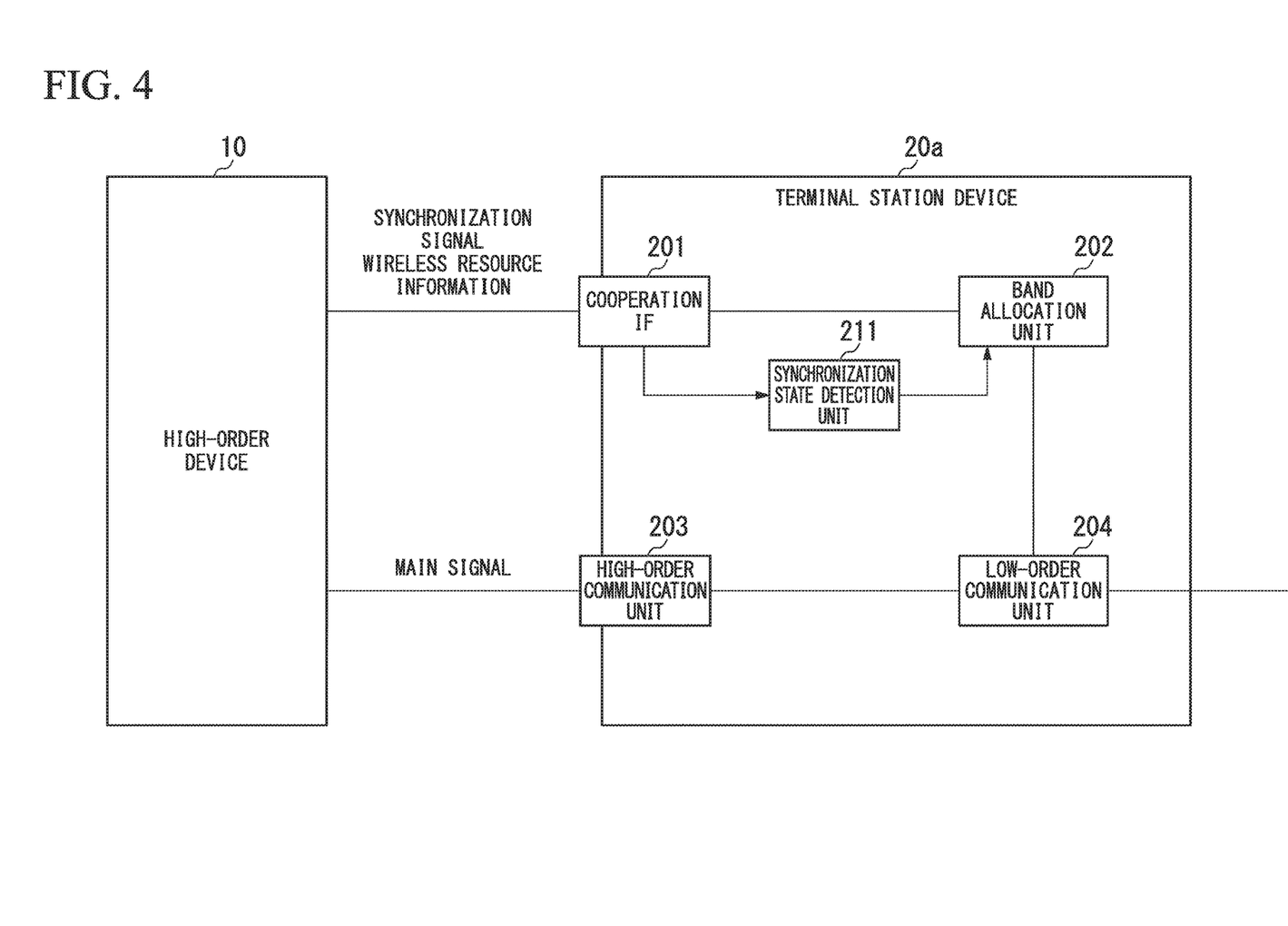
FIG. 4 is a schematic block diagram showing a functional configuration of a terminal station device 20a in a second embodiment.

FIG. 4 is a schematic block diagram showing a functional configuration of a terminal station device 20a in a second embodiment. The terminal station device 20a includes a synchronization state detection unit 211, in addition to a cooperation IF 201, a band allocation unit 202, a high-order communication unit 203, and a low-order communication unit 204. Functions of the synchronization state detection unit 211 may be realized, for example, by executing a program by means of a CPU and a memory provided in the terminal station device 20a. Moreover, all or a part of the functions of the synchronization state detection unit 211 may be realized by using hardware such as ASIC, PLD, FPGA, and the like. The program to be executed may be recorded on a computer-readable recording medium. The computer-readable recording medium is, for example, a portable medium such as a flexible disk, a magnetic optical disk, a ROM, a CD-ROM, and the like, or a storage device such as a hard disk built into a computer system. The program may be transmitted via an electrical communication line. Hereinafter, the terminal station device 20a of the second embodiment will be described with respect to points different from the terminal station device 20 of the first embodiment.

Based on a synchronization signal transmitted from the high-order device 10, the synchronization state detection unit 211 determines whether or not the clocks are synchronized between the high-order device 10 and the apparatus itself (the terminal station device 20a). For example, in the case where the synchronization signal cannot be received from the high-order device 10, the synchronization state detection unit 211 may determine that it is out of synchronization. For example, in the case where the deviation in the clocks exceeds a preliminarily defined threshold value, the synchronization state detection unit 211 may determine that it is out of synchronization.

Figure 5:
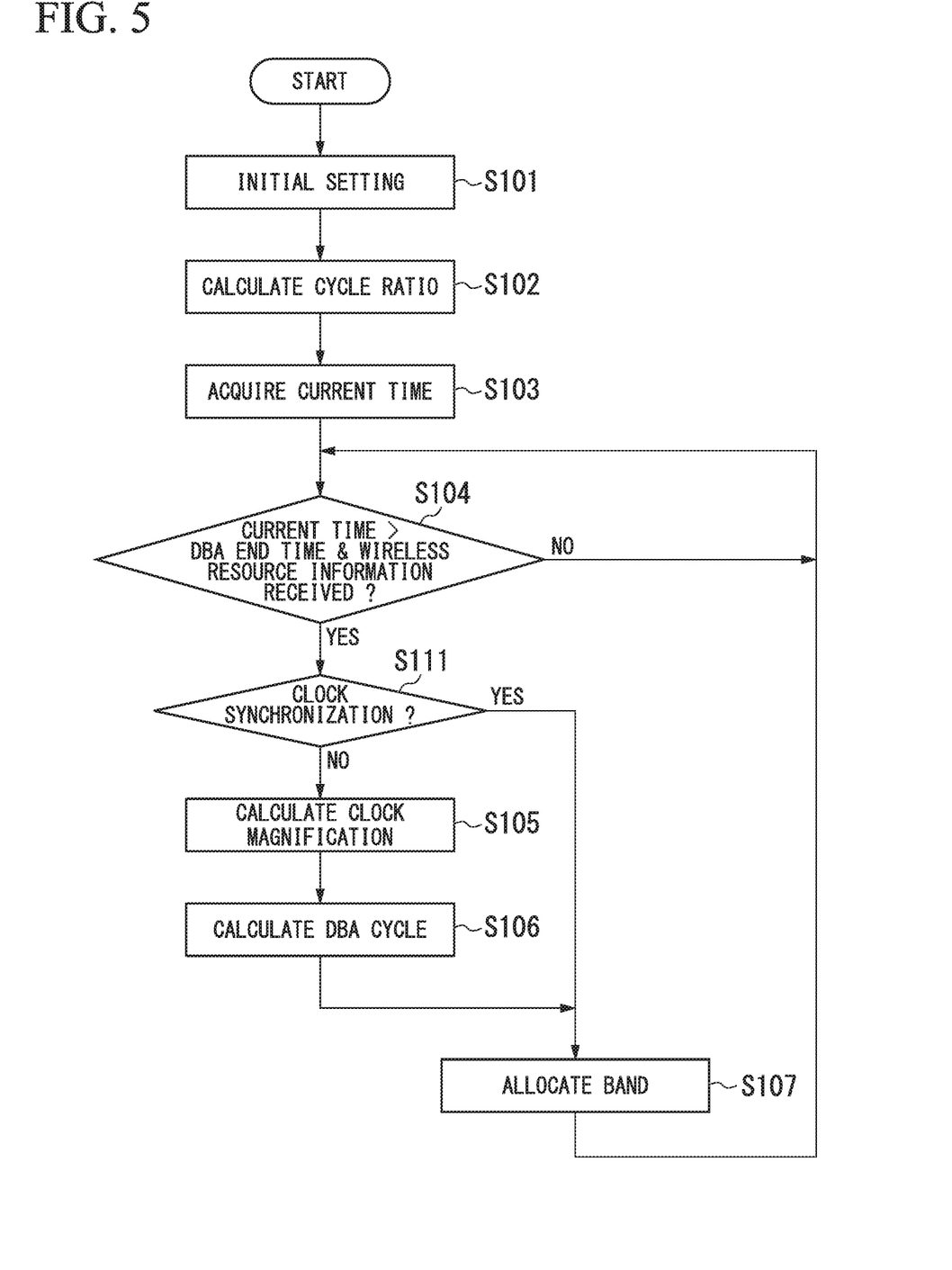
FIG. 5 is a flowchart showing a specific example of a processing flow of the terminal station device 20a in the second embodiment.

FIG. 5 is a flowchart showing a specific example of a processing flow of the terminal station device 20a in the second embodiment. The same portions as those of the terminal station device 20 in the first embodiment are denoted by the same reference symbols of FIG. 3 and descriptions thereof are thereby omitted.

If the condition is satisfied in the processing of Step S104 (YES in Step S104), the synchronization state detection unit 211 determines whether or not the clocks are synchronized between the high-order device 10 and the apparatus itself (the terminal station device 20a) (Step S111). If it is determined that the clocks are not synchronized (NO in Step S111), the band allocation unit 202 calculates the clock magnification and the DBA cycle (Steps S105 and S106). This processing updates the values of the clock magnification and the DBA cycle according to the wireless resource information reception interval. Then, the band allocation unit 202 executes the band allocation process (Step S107). On the other hand, if it is determined that the clocks are synchronized (YES in Step S111), the band allocation unit 202 executes the band allocation process without calculating the clock magnification and the DBA cycle (Step S107). In this case, the processing of the band allocation unit 202 is executed based on the clock that is synchronized with the high-order device 10 (the clock of the terminal station device 20).

In the terminal station device 20a of the second embodiment configured as described above, the clock magnification and the DBA cycle are calculated only in the case where it is determined that the clocks are not synchronized. Therefore, it is possible to reduce the amount of calculation executed by the band allocation unit 202, and to reduce the load on the processing resource in the band allocation unit 202. Further, in the terminal station device 20a of the second embodiment, it is possible to obtain an effect similar to that of the terminal station device 20 of the first embodiment.

A terminal station device according to an embodiment is a terminal station device of a communication system in which a high-order device, the terminal station device, an end-terminal device, and a low-order device are communicably connected in this order, the high-order device notifies the low-order device of resource information indicating a resource that is usable in communication, and thereby the resource is allocated to the low-order device. The terminal station device includes: a band allocation unit that allocates a band that is permitted to be used by the end-terminal device for transmission processing to the terminal station device, based on an interval at which the terminal station device has received the resource information.

The above-mentioned terminal station device may further include: an interface that receives the resource information from the high-order device. The band allocation unit may allocate the band, based on an interval at which the interface has received the resource information.

In the above-mentioned terminal station device, the band allocation unit may determine a dynamic band allocation cycle which is an allocation target time for the band that is permitted to be used by the end-terminal device for transmission processing to the terminal station device.

In the above-mentioned terminal station device, the band allocation unit may determine the dynamic band allocation cycle, based on a ratio of an interval at which the resource information has been received to an interval at which the high-order device has notified the terminal station device of the resource information.

In the above-mentioned terminal station device, the band allocation unit may determine a new dynamic band allocation cycle, based on a previous dynamic band allocation cycle, an interval at which the resource information has been received, and an interval at which the high-order device has notified the terminal station device of the resource information.

In the above-mentioned terminal station device, the band allocation unit may determine a new dynamic band allocation cycle to be a cycle longer than a previous dynamic band allocation cycle, in a case where an interval at which the resource information has been received is longer than an interval at which the high-order device notifies the terminal station device of the resource information. The band allocation unit may determine a new dynamic band allocation cycle to be a cycle shorter than a previous dynamic band allocation cycle, in a case where an interval at which the resource information has been received is shorter than an interval at which the high-order device has notified the terminal station device of the resource information.

The above-mentioned terminal station device may further include: a synchronization state detection unit that determines whether a clock of the terminal station device is synchronized with a clock of the high-order device. The band allocation unit may allocate the band based on a clock of the terminal station device in the case where the synchronization state detection unit determines that the clock of the terminal station device is synchronized. The band allocation unit may allocate the band based on an interval at which the resource information has been received, in the case where the synchronization state detection unit determines that the clock of the terminal station device is not synchronized.

The embodiments of the present invention have been described above in detail with reference to the figures. However, the specific configuration is not limited to these embodiments, and designs and the like within a scope not deviating from the gist of the present invention are included.

INDUSTRIAL APPLICABILITY

The present invention may be applied to a terminal station device and a band allocation method.

REFERENCE SYMBOLS

10 High-order device
20, 20a Terminal station device
30 End-terminal device
40 Low-order device
50 User device
60 High-order network
70 Relay network
71 Relay unit
80 Low-order network
100 Communication system
201 Cooperation IF
202 Band allocation unit
203 High-order communication unit
204 Low-order communication unit
211 Synchronization state detection unit

The invention claimed is:

1. A terminal station device of a communication system, wherein, in the communication system, a high-order device, the terminal station device, an end-terminal device, and a low-order device are communicably connected in this order, the high-order device notifies the low-order device of resource information indicating a resource that is usable in communication, and thereby the resource is allocated to the low-order device, the terminal station device comprising:
  a band allocation unit that allocates a band that is permitted to be used by the end-terminal device for transmission processing to the terminal station device, based on an interval at which the terminal station device has received the resource information;
  wherein the band allocation unit determines a dynamic band allocation cycle which is an allocation target time for the band that is permitted to be used by the end-terminal device for transmission processing to the terminal station device;
  wherein the band allocation unit determines the dynamic band allocation cycle, based on a ratio of an interval at which the resource information has been received to an interval at which the high-order device has notified the terminal station device of the resource information.

2. The terminal station device according to claim 1, further comprising:
an interface that receives the resource information from the high-order device,
wherein the band allocation unit allocates the band, based on an interval at which the interface has received the resource information.

3. The terminal station device according to claim 1, further comprises
a synchronization state detection unit that determines whether a clock of the terminal station device is synchronized with a clock of the high-order device,
wherein the band allocation unit allocates the band based on a clock of the terminal station device in the case where the synchronization state detection unit determines that the clock of the terminal station device is synchronized, and the band allocation unit allocates the band based on an interval at which the resource information has been received, in the case where the synchronization state detection unit determines that the clock of the terminal station device is not synchronized.

4. The terminal station device according to claim 2 further comprises
a synchronization state detection unit that determines whether a clock of the terminal station device is synchronized with a clock of the high-order device,
wherein the band allocation unit allocates the band based on a clock of the terminal station device in the case where the synchronization state detection unit determines that the clock of the terminal station device is synchronized, and the band allocation unit allocates the band based on an interval at which the resource information has been received, in the case where the synchronization state detection unit determines that the clock of the terminal station device is not synchronized.

5. A terminal station device of a communication system, wherein, in the communication system, a high-order device, the terminal station device, an end-terminal device, and a low-order device are communicably connected in this order, the high-order device notifies the low-order device of resource information indicating a resource that is usable in communication, and thereby the resource is allocated to the low-order device, the terminal station device comprising:
a band allocation unit that allocates a band that is permitted to be used by the end-terminal device for transmission processing to the terminal station device, based on an interval at which the terminal station device has received the resource information;
wherein the band allocation unit determines a dynamic band allocation cycle which is an allocation target time for the band that is permitted to be used by the end-terminal device for transmission processing to the terminal station device;
wherein the band allocation unit determines a new dynamic band allocation cycle, based on a previous dynamic band allocation cycle, an interval at which the resource information has been received, and an interval at which the high-order device has notified the terminal station device of the resource information.

6. The terminal station device according to claim 5, further comprises
an interface that receives the resource information from the high-order device, wherein the band allocation unit allocates the band, based on an interval at which the interface has received the resource information;
wherein the band allocation unit determines a new dynamic band allocation cycle to be a cycle longer than a previous dynamic band allocation cycle, in a case where an interval at which the resource information has been received is longer than an interval at which the high-order device notifies the terminal station device of the resource information, and
the band allocation unit determines a new dynamic band allocation cycle to be a cycle shorter than a previous dynamic band allocation cycle, in a case where an interval at which the resource information has been received is shorter than an interval at which the high-order device has notified the terminal station device of the resource information.

7. The terminal station device according to claim 5, further comprising:
a synchronization state detection unit that determines whether a clock of the terminal station device is synchronized with a clock of the high-order device,
wherein the band allocation unit allocates the band based on a clock of the terminal station device in the case where the synchronization state detection unit determines that the clock of the terminal station device is synchronized, and the band allocation unit allocates the band based on an interval at which the resource information has been received, in the case where the synchronization state detection unit determines that the clock of the terminal station device is not synchronized.

8. The terminal station device according to claim 6, further comprising:
a synchronization state detection unit that determines whether a clock of the terminal station device is synchronized with a clock of the high-order device,
wherein the band allocation unit allocates the band based on a clock of the terminal station device in the case where the synchronization state detection unit determines that the clock of the terminal station device is synchronized, and the band allocation unit allocates the band based on an interval at which the resource information has been received, in the case where the synchronization state detection unit determines that the clock of the terminal station device is not synchronized.

9. A terminal station device of a communication system, wherein, in the communication system, a high-order device, the terminal station device, an end-terminal device, and a low-order device are communicably connected in this order, the high-order device notifies the low-order device of resource information indicating a resource that is usable in communication, and thereby the resource is allocated to the low-order device, the terminal station device comprising:
a band allocation unit that allocates a band that is permitted to be used by the end-terminal device for transmission processing to the terminal station device, based on an interval at which the terminal station device has received the resource information;
wherein the band allocation unit determines a dynamic band allocation cycle which is an allocation target time for the band that is permitted to be used by the end-terminal device for transmission processing to the terminal station device;
wherein the band allocation unit determines a new dynamic band allocation cycle to be a cycle longer than a previous dynamic band allocation cycle, in a case where an interval at which the resource information has been received is longer than an interval at which the high-order device notifies the terminal station device of the resource information, and wherein the band allocation unit determines a new dynamic band allocation cycle to be a cycle shorter than a previous dynamic band allocation cycle, in a case where an interval at which the resource information has been received is shorter than an interval at which the high-order device has notified the terminal station device of the resource information.

10. The terminal station device according to claim 9, further comprising:

an interface that receives the resource information from the high-order device, wherein the band allocation unit allocates the band, based on an interval at which the interface has received the resource information.

11. The terminal station device according to claim 9, further comprising:

a synchronization state detection unit that determines whether a clock of the terminal station device is synchronized with a clock of the high-order device, wherein the band allocation unit allocates the band based on a clock of the terminal station device in the case where the synchronization state detection unit determines that the clock of the terminal station device is synchronized, and the band allocation unit allocates the band based on an interval at which the resource information has been received, in the case where the synchronization state detection unit determines that the clock of the terminal station device is not synchronized.

12. The terminal station device according to claim 10, further comprising:

a synchronization state detection unit that determines whether a clock of the terminal station device is synchronized with a clock of the high-order device, wherein the band allocation unit allocates the band based on a clock of the terminal station device in the case where the synchronization state detection unit determines that the clock of the terminal station device is synchronized, and the band allocation unit allocates the band based on an interval at which the resource information has been received, in the case where the synchronization state detection unit determines that the clock of the terminal station device is not synchronized.

13. A band allocation method performed by a terminal station device of a communication system, wherein, in the communication system, a high-order device, the terminal station device, an end-terminal device, and a low-order device are communicably connected in this order, the high-order device notifies the low-order device of resource information indicating a resource that is usable in communication, and thereby the source is allocated to the low-order device, the band allocation method comprising:

allocating, a band allocation unit, a band that is permitted to be used by the end-terminal device for transmission processing to the terminal station device, based on an interval at which the terminal station device has received the resource information; and determining, by the band allocation unit, a dynamic band allocation cycle which is an allocation target time for the band that is permitted to be used by the end-terminal device for transmission processing to the terminal station device; wherein the band allocation unit determines the dynamic band allocation cycle, based on a ratio of an interval at which the resource information has been received to an interval at which the high-order device has notified the terminal station device of the resource information.

14. A band allocation method performed by a terminal station device of a communication system, wherein, in the communication system, a high-order device, the terminal station device, an end-terminal device, and a low-order device are communicably connected in this order, the high-order device notifies the low-order device of resource information indicating a resource that is usable in communication, and thereby the source is allocated to the low-order device, the band allocation method comprising:

allocating, by a band allocation unit, a band that is permitted to be used by the end-terminal device for transmission processing to the terminal station device, based on an interval at which the terminal station device has received the resource information;

determining, by the band allocation unit, a dynamic band allocation cycle which is an allocation target time for the band that is permitted to be used by the end-terminal device for transmission processing to the terminal station device; and determining, by the band allocation unit, a new dynamic band allocation cycle, based on a previous dynamic band allocation cycle, an interval at which the resource information has been received, and an interval at which the high-order device has notified the terminal station device of the resource information.

15. A band allocation method performed by a terminal station device of a communication system, wherein, in the communication system, a high-order device, the terminal station device, an end-terminal device, and a low-order device are communicably connected in this order, the high-order device notifies the low-order device of resource information indicating a resource that is usable in communication, and thereby the source is allocated to the low-order device, the band allocation method comprising:

allocating, by a band allocation unit, a band that is permitted to be used by the end-terminal device for transmission processing to the terminal station device, based on an interval at which the terminal station device has received the resource information;

determining, by the band allocation unit, a dynamic band allocation cycle which is an allocation target time for the band that is permitted to be used by the end-terminal device for transmission processing to the terminal station device;

determining, by the band allocation unit, a new dynamic band allocation cycle to be a cycle longer than a previous dynamic band allocation cycle, in a case where an interval at which the resource information has been received is longer than an interval at which the high-order device notifies the terminal station device of the resource information; and determining, by the band allocation unit, a new dynamic band allocation cycle to be a cycle shorter than a previous dynamic band allocation cycle, in a case where an interval at which the resource information has been received is shorter than an interval at which the high-order device has notified the terminal station device of the resource information.

* * * * *